United States Patent

Adams et al.

[15] 3,680,011

[45] July 25, 1972

[54] LOSS CANCELLING RESONATOR AND FILTERS

[72] Inventors: David K. Adams, Portola Valley; Raymond Y.-C. Ho, Sunnyvale, both of Calif.

[73] Assignee: Stanford Research Institute, Menlo Park, Calif.

[22] Filed: Aug. 3, 1970

[21] Appl. No.: 60,381

[52] U.S. Cl. ............................ 333/70 R, 333/76, 333/80 T, 307/295

[51] Int. Cl. ............................ H03h 7/10, H03h 11/00

[58] Field of Search ............................ 333/70, 75, 76, 80, 80 T

[56] References Cited

UNITED STATES PATENTS

| | | | |
|---|---|---|---|
| 2,930,996 | 3/1960 | Chow et al. | 333/80 T |
| 3,054,969 | 9/1962 | Harrison | 331/76 |
| 3,074,026 | 1/1963 | Kuzminsky | 333/76 X |
| 3,152,309 | 10/1964 | Bogusz et al. | 333/80 T |
| 3,267,397 | 8/1966 | Skinner | 333/80 |
| 3,358,246 | 12/1967 | Bensasson | 333/75 X |
| 3,416,105 | 12/1968 | Vallese | 333/80 T |
| 3,469,214 | 9/1969 | Sasaki et al. | 333/80 |
| 3,531,652 | 9/1970 | Aemmer et al. | 333/70 R X |
| 3,551,846 | 12/1970 | Hansen et al. | 333/80 T X |

*Primary Examiner*—Herman Karl Saalbach
*Assistant Examiner*—Marvin Nussbaum
*Attorney*—Flehr, Hohbach, Test, Albritton & Herbert

[57] ABSTRACT

A loss cancelling resonator is disclosed which comprises a passive LC circuit coupled to a transistor in the inverted-common-collector configuration. Typical notch filter configurations are also disclosed including notch filters with more than one resonator. Switchable notch filters are disclosed as well as a frequency synthesizer which utilizes a plurality of switchable notch filters.

13 Claims, 12 Drawing Figures

DAVID K. ADAMS &
RAYMOND Y. C. HO
INVENTORS

BY
Flehr, Hohbach, Test, Albritton & Herbert
ATTORNEYS

DAVID K. ADAMS &
RAYMOND Y. C. HO
INVENTORS

BY Fehr, Hohbach, Test, Albritton & Herbert
ATTORNEYS

DAVID K. ADAMS &
RAYMOND Y.C. HO
INVENTORS

BY Flehr, Hohbach, Test, Albritton & Herbert
ATTORNEYS

DAVID K. ADAMS &
RAYMOND Y.C. HO
INVENTORS

BY

Flehr, Hohbach, Test
Albritton & Herbert
ATTORNEYS

LOSS CANCELLING RESONATOR AND FILTERS

CROSS REFERENCES TO RELATED APPLICATIONS

This invention utilizes an active microwave inductive element which is the subject of a patent application entitled: "Active Microwave Inductive or Filter Element and Applications," Ser. No. 821,317 filed May 2, 1969, now abandoned, and assigned to the assignee of the present invention.

BACKGROUND OF THE INVENTION

This invention pertains to electrical resonators and filters and more particularly relates to an active loss cancelling resonator for use in filters and filters incorporating the loss cancelling resonator.

As the size of high frequency circuits has become smaller through the use of integrated circuit techniques, it has become important to miniaturize normally passive circuits and components such as filters. High frequency circuits, including filters, are generally distributed circuits involving lengths of transmission line, with limited use of lumped elements such as capacitors. The more lumped elements that are used the smaller the resultant circuitry; but this decrease in size is usually achieved only at a sacrifice in performance. Specifically, these miniaturization techniques lead to reduced element Q. Low Q filter elements degrade signal-to-noise ratios and provide poor frequency selectivity.

In order to provide narrow bandwidth filters with low insertion loss present techniques require distributed elements with a large physical volume. Passive capacitors with small physical size may have acceptable Q; however, inductors must approach a significant fraction of wavelength in dimension in order to have high Q. The difficulties associated with lumped circuit construction have led to an examination of the possibilities of simulating conductors and resonators with active elements and compact passive elements.

In applicant's co-pending Pat. application entitled "Active Microwave Inductive or Filter Element and Application," Ser. No. 821,317 filed May 2, 1969, now abandoned and assigned to the assignee of the present invention, there is disclosed an active inductance of essentially infinite Q for use at microwave frequencies. The basic active inductance is constructed utilizing the emitter electrode of a transistor as the input port; the collector electrode is grounded and the base electrode circuit is adjusted so that inductance and useful negative resistance are translated to the emitter from the base circuit at substantially the center of the desired frequency band of operation. The transistor current is adjusted so the internal emitter resistance of the transistor essentially cancels the negative translated resistance to yield a synthesized microwave inductance with very high Q.

BRIEF SUMMARY OF THE INVENTION

It is an object of the present invention to provide an improved active resonator for high frequencies.

It is another object of this invention to provide an active loss cancelling resonator for use in filters.

It is another object of this invention to provide a tunable active notch filter.

It is another object of this invention to provide an active switchable notch filter.

It is another object of this invention to provide a tunable notch filter which utilizes input and output impedance transformers.

It is another object of this invention to provide a frequency synthesizer which utilizes active switchable notch filters.

Briefly, according to one embodiment of the invention, there is provided an active resonator which is utilized as a loss-cancelling resonator in a filter. The resonator generally comprises an inverted common collector transistor configuration with resistance and inductance in the base circuit. This resistance and inductance are selected to provide inductance and negative resistance at the emitter terminal. Further in accordance with the invention a de-coupling inductance is connected between the emitter and collector of the transistor. Using this basic configuration single or multi resonator filters can be constructed.

BRIEF DESCRIPTION OF THE DRAWINGS

The novel features which are believed to be characteristic of the invention are set forth with particularity in the appended claims. The invention itself, however, both as to its organization and method of operation, together with further objects and advantages thereof, may best be understood by reference to the following description taken in conjunction with the accompanying drawings in which:

DESCRIPTION OF THE PREFERRED EMBODIMENTS

Figures 1, 2, 3, 4:
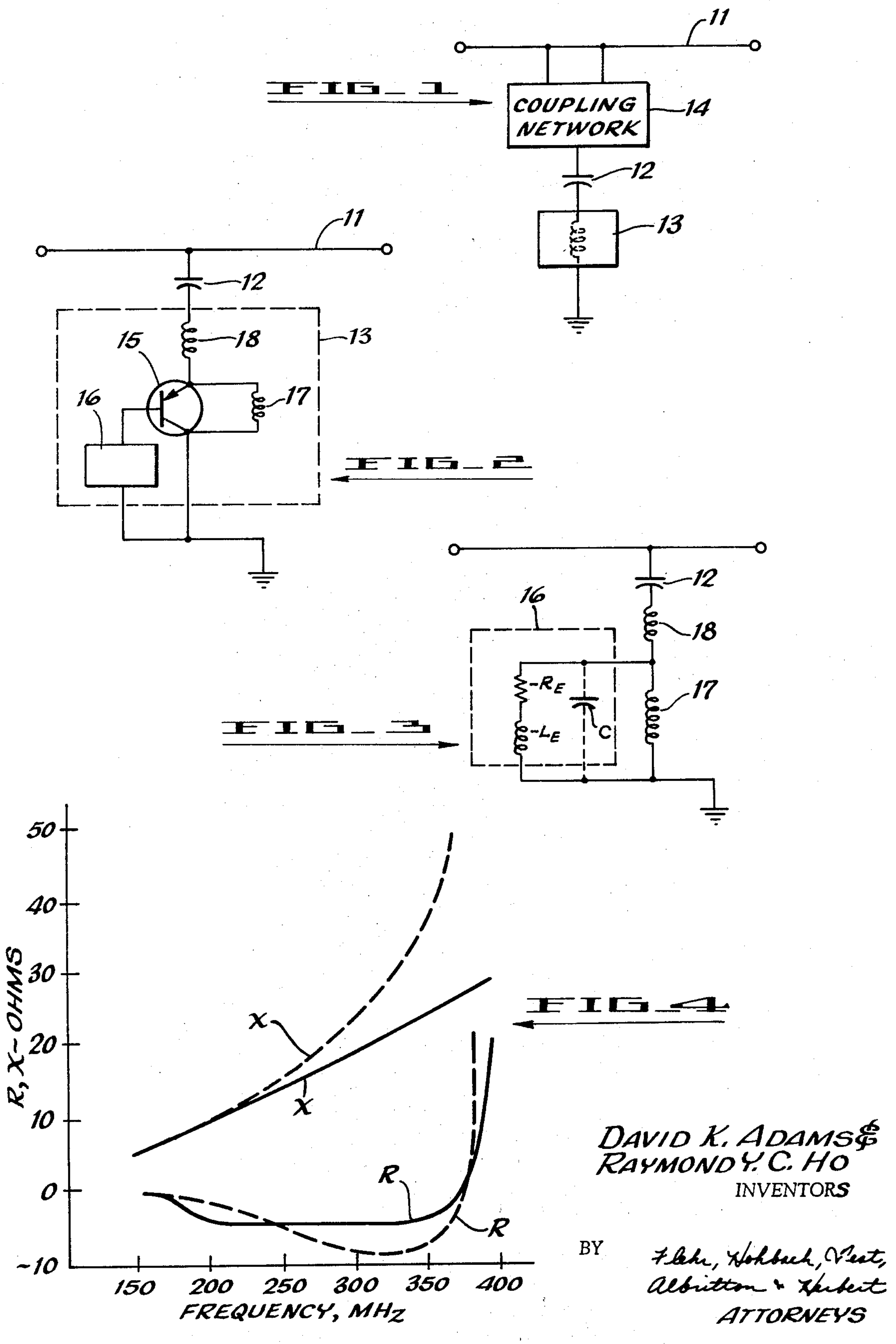
FIG. 1 is a schematic diagram of a generalized filter.
FIG. 2 is a schematic diagram of an active filter or resonator constructed in accordance with the principles of this invention.
FIG. 3 is the equivalent circuit for the active filter of FIG. 2.
FIG. 4 is a plot of rejection versus frequency for the active filter or resonator of FIG. 2.

Referring now to FIG. 1, there is shown a generalized circuit diagram of a filter which may, for example, be a notch filter. The basic configuration of a filter as shown in FIG. 1 consists of one or more resonant circuits coupled to an otherwise broadband transmission line 11 such that electrical signals with frequencies close to the resonant frequency of the coupled resonator or resonators are prevented from passing to the output, and instead are reflected back at the input. The typical resonator circuit includes a capacitance 12 and an inductance 13 which form a resonant circuit at the desired notch frequency. The resonant circuit is coupled to the broadband transmission line 11 by coupling network 14 which is only functionally shown in FIG. 1. Suitable coupling techniques are direct coupling, capacitive, or inductive coupling. These and other coupling techniques are well known in the art.

The essence of this invention is that a transistor circuit can provide negative resistance at or near the resonant frequency of each resonator to cancel losses associated with passive components in the resonator. This enables very small resonators to be constructed which have essentially infinite unloaded Q.

Referring to FIG. 2, there is shown a resonator in accordance with the principles of this invention directly coupled to the broadband transmission line 11. A basic concept of the inductive transistor circuit as applied to active filters is described in applicant's co-pending patent application entitled "Active Microwave Inductive or Filter Element and Application," Ser. No. 821,317, filed May 2, 1969. A transistor 15 is connected in the inverted common collector configuration and is used to provide inductance and negative resistance at the emitter terminal. The physical mechanisms involved are the transistor transit-time and the parasitic circuit elements associated with the transistor and its package. In FIG. 2 these parasitic circuit elements are indicated by block 16 connected between the base of transistor 15 and a reference potential which in this case is ground. A physical de-coupling inductance 17 is connected between the emitter and collector of transistor 15. The active resonator is then completed by adding a physical inductance 18 and capacitor 12 between the broadband transmission line 11 and the emitter of transistor 15.

Referring now to FIG. 3, there is shown the equivalent circuit of the physical circuit of FIG. 2. The parasitic circuit elements 16 include parasitic base to ground capacitance C, the synthesized negative resistance $-R_e$ and the synthesized inductance $L_e$. The purpose of the physical de-coupling inductor 17 is to reduce the effective values of $L_e$ and $-R_e$. This improves the RF power handling capability of the de-coupled transistor since the Rf current in the resonator divides between the transistor and inductor 17. In filter applications the inductive transistor circuit exhibits large signal saturation effects when the RF voltage or current level is large enough to produce non-linear effects. Due to impedance transformations within the filter the RF signal level across the inductive portion of each resonator can significantly exceed the signal level at the filter input or output. By de-coupling through the use of inductor 17 the threshold for large signal saturation can be significantly increased. Further, the use of the de-coupling inductance 17 tends to linearize the inductance and negative resistance appearing at the emitter of transistor 15. This linearization, as is more fully discussed hereinafter, permits the resonator to be tuned over a range of frequencies while still maintaining a proper value of negative resistance so that losses are cancelled. Thus, for example, an active tunable notch filter can be constructed which is tunable over some frequency range while still maintaining high Q.

It should be noted that a majority of the inductance in the resonator is realized by the passive inductance 18 which can have considerably better temperature stability than the transistor synthesized inductance $L_e$. By designing the inductive transistor circuit to produce a relatively large negative resistance $-R_e$ before de-coupling, the final value of negative resistance appearing in series with inductor 18 after proper de-coupling can be sufficient to cancel the losses inherent in inductor 18 and capacitor 12. This negative resistance is adjustable since $-R_e$ is dependent on transistor current. In this connection it should be pointed out that FIGS. 2 and 3 represent RF circuits. Proper dc biasing is, of course, applied to transistor 15 and the resonator. Thus although a physical inductance 18 is used in the resonator as well as the transistor synthesized inductance the inductor 18 may still have small dimensions since its intrinsic Q need not be high. Due to the negative resistance supplied by the transistor, losses in the physical inductor 18 and physical capacitor 12 are cancelled out so that the overall Q of the resonator is very high.

Referring to FIG. 4, there is shown a plot of reactance and resistance in ohms versus frequency for the resonator 13 of FIG. 2 as it might be utilized in a notch filter for operation at frequencies around 300–350 MHz. The dotted curve in FIG. 4 labeled X represents the inductive reactance of the resonator 13 as it would appear without the decoupling inductance 17 and the dotted curve labeled R represents the resistance of the resonator 13 as it would appear without the decoupling inductance 17. As can be seen in FIG. 4 without de-coupling inductance 17 the inductive reactance increases from near zero in approximately an exponential fashion as the frequency is increased while the resistance R decreases from zero to a maximum negative value (near 350 MHz, for example) and then sharply increases. Thus, without the de-coupling inductance 17, the loss cancelling ability of the resonator due to its negative resistance varies considerably with frequency.

The solid curves labeled X and R in FIG. 4 correspond respectively to the resonator values of inductive reactance and resistance when decoupling inductance 17 is added. As can be seen in FIG. 4, the de-coupling inductance serves to linearize the inductive reactance and the negative resistance. In particular, the negative resistance of the resonator is almost constant over a frequency range between 200 and 350 MHz so that an active tunable notch filter may be constructed which has a very high Q over the frequency range 200–350 MHz.

Figure 5:
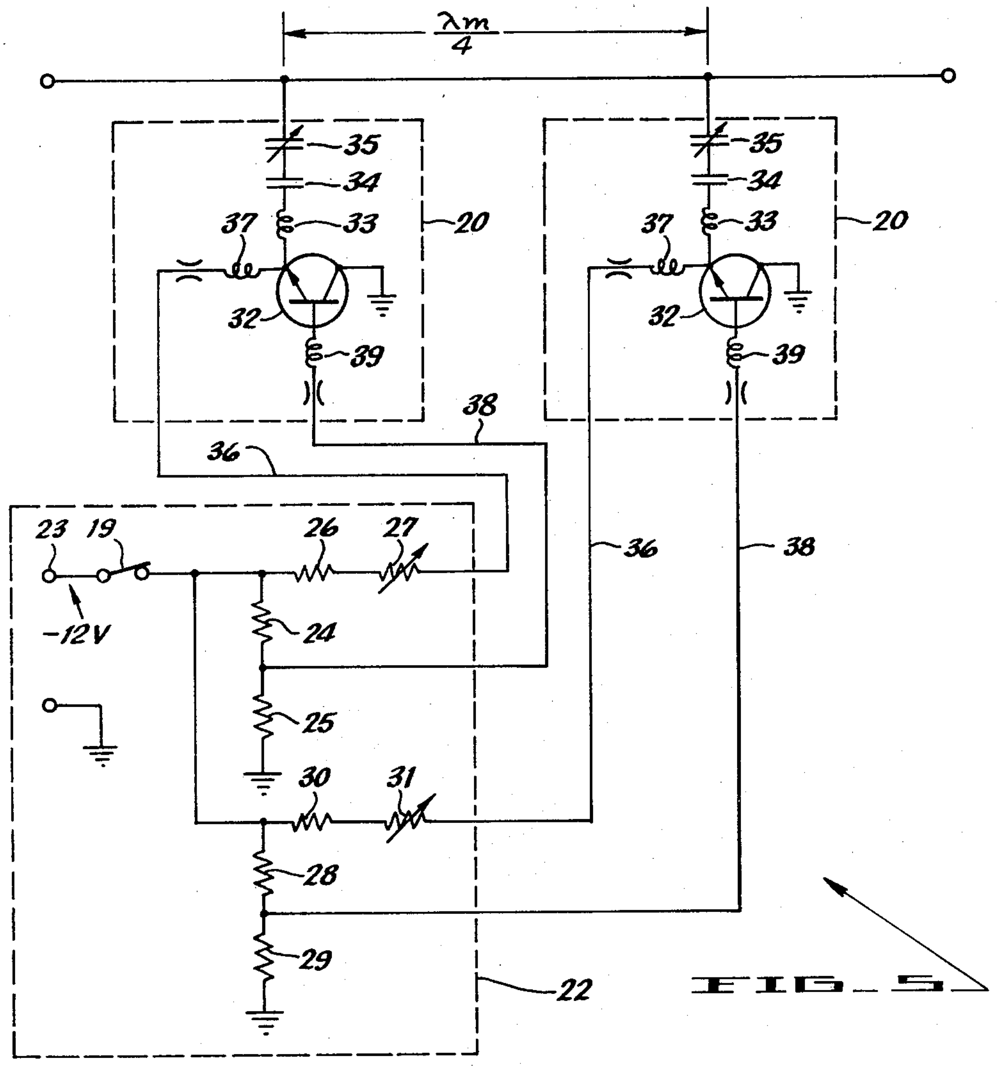
FIG. 5 is a schematic diagram of another embodiment of a notch filter and showing the biasing for the active elements in the notch filter.

By the way of a specific example FIG. 5 shows a schematic circuit diagram of a two-pole active notch filter for high rejection at one GHz. The two-pole active notch filter of FIG. 5 comprises two resonators 20 and 21 and a bias power supply 22. As can be seen in FIG. 4 the two resonators 20 and 21 are quarter wave length coupled as is well known in the art when passive filters are utilized.

The bias power supply 22 has a negative 12 volts present at a terminal 23. This voltage is applied through a switch 19 to a resistive voltage divider network comprising resistors 24, 25 and 26 and potentiometer 27 and furnishing dc biasing for the resonator 20. A similar voltage divider network comprising resistors 28, 29, 30 and potentiometer 31 is also connected through switch 19 to terminal 23 and furnishes biasing for the resonator 21.

Resonator 20 and 21 are identical; therefore only resonator 20 will be described. Resonator 20 comprises a transistor 32 which has its collector connected to a reference potential which in this case is ground. The emitter of transistor 32 is connected through an inductance 33, a capacitor 34 and a variable capacitor 35 to be broadband transmission line 11. A conductor 36 which for purposes of RF is connected to ground has an unshielded inductive portion 37 which is connected to the emitter of transistor 32. Similarly, a conductor 38 which for RF purposes is also connected to ground has an unshielded inductive portion 39 which is connected to the base of transistor 32. The unshielded portion 37 functions a a de-coupling inductance connected between the emitter and collector of transistor 32. The unshielded portion 39 functions as an inductance in the base circuit of transistor 32 for supplementing the parasitic inductance associated with transistor 32. As discussed before resonator 21 is identical to resonator 20 so that the same reference numerals have been applied to elements in the resonator 21 as to elements in the resonator 20.

In further illustration of a specific example, the circuit of FIG. 5 may be constructed using components as follows:

| Elements | Values |
|---|---|
| resistors 24 and 28 | 475 ohms |
| resistors 25 and 29 | 4.7 k ohms |
| resistors 26 and 30 | 20 ohms |
| potentiometers 27 and 31 | 100 ohms |
| transistors 32 | 2N 5109 |
| variable capacitors 35 | 0.35–0.50 picofarads |
| capacitors 34 | 2.2 picofarads |
| inductors 33 | 1 inch of number 16 gage wire |
| unshielded conductor portions 37 | ¼ inch number 22 gage wire |
| unshielded conductor portions 39 | ⅜ inch number 22 gage wire |

The inductance provided by conductor portions 37 function as de-coupling inductors as previously discussed and are used in the resonators 20 and 21 to provide improved stability. Also, variable capacitors 35 may be adjusted to somewhat different frequencies within the respective resonators 20 and 21 to provide an increased bandwidth a higher rejection levels and to give greater temperature stability.

Figure 6:
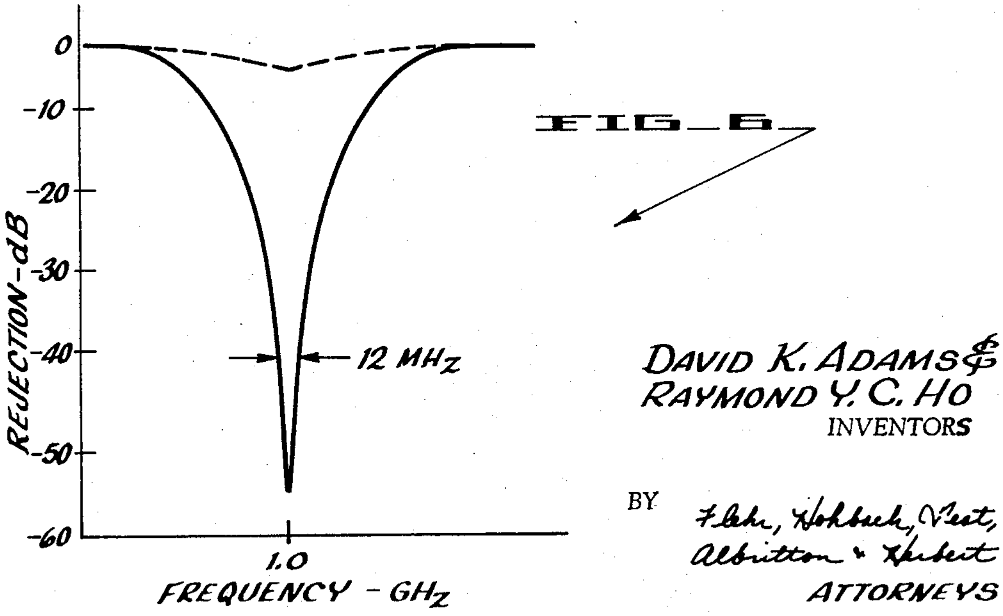
FIG. 6 is a plot of rejection in dB versus frequency in GHz for the active notch filter of FIG. 5.

Referring now to FIG. 6 there is shown a performance diagram for the notch filter of FIG. 2 in which rejection in *d* B is plotted against frequency in MHz. The solid line in FIG. 6 illustrates the characteristics of the active notch filter of FIG. 5. As can be seen from FIG. 6 the active notch filter gives greater than 55 *d*B rejection at one GHz. For the circuit of FIG. 5 it has been found that better than 55 *d*B rejection at one GHZ is maintained between −55° C and +85° C. At room temperature the rejection is greater than 40 *d*B over a 12 MHz bandwidth.

When bias is removed from the active notch filter of FIG. 5 (such as by opening switch 19) the notch filter will pass the previously rejected frequency band with a very low loss. For example, the notch filter of FIG. 5 has more than 55 dB rejection when biased and only one dB rejection when the bias is removed. The characteristics when bias is removed are illustrated by the dotted line in FIG. 6. Therefore, an active notch filter constructed in accordance with this invention can be used in applications where switching is required.

Figure 7:
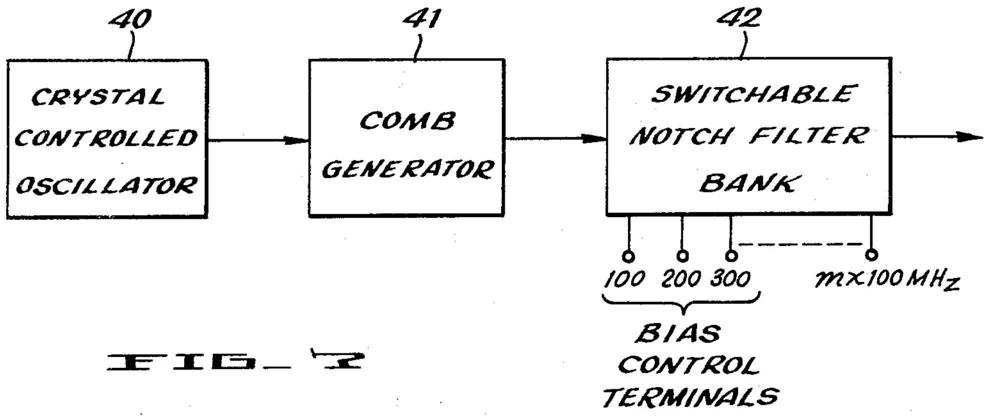
FIG. 7 is a block diagram of a frequency synthesizer utilizing a plurality of switchable notch filters.

Referring now to FIG. 7 there is shown a frequency synthesizer constructed of a plurality of switchable notch filters. An oscillator 40 which may for example be a crystal controlled oscillator drives a comb generator 41. Comb generators are well known in the art and comb generator 41 is adapted to produce as spectrum of frequencies at 100 MHz increments for example. A switchable notch filter bank 42 is connected to the common transmission line output of comb generator 41 and the switchable notch filters in the bank 42 are tuned at increments of 100 MHz. Since each comb frequency corresponds to one of the switchable notch filters, when all notch filters are biased, no comb lines pass through; but when the bias is removed from any one of the notch filters the corresponding comb line or frequency immediately appears in the output. Thus the bank of switchable notch filters together with a comb spectrum generator can be used as a frequency synthesizer. By way of a specific example, a switchable notch filter bank 42 may be constructed having a bank of eight notch filters. Such a switchable notch filter bank may be operated between 125 and 1000 MHz and more than 40 dB rejection will be obtained at each frequency under bias. Less than one dB insertion loss results with the bias removed.

Both fixed-tuned and tunable notch filters may be constructed in accordance with the principles of this invention. As was indicated in connection with the active tunable notch filter of FIG. 4, the variable capacitors might be adjusted to tune the individual resonators to slightly different frequencies so as to provide increased bandwidth.

Figure 8:
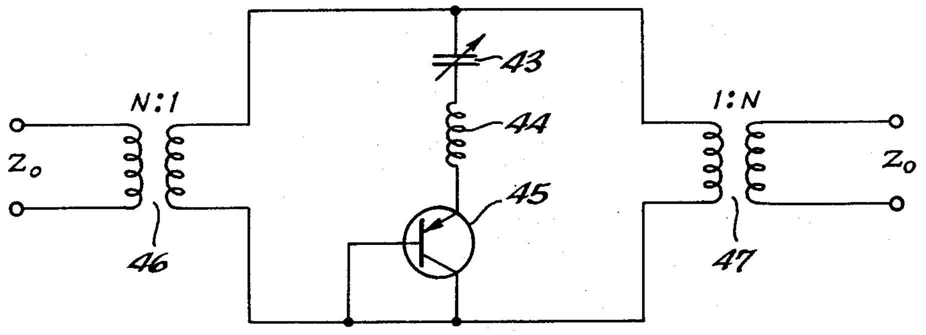
FIG. 8 is a schematic diagram of another embodiment of an active notch filter which utilizes impedance transformers.

Referring now to FIG. 8 there is shown an active tunable notch filter which comprises a passive LC circuit including a tunable capacitor 43 and an inductor 44 in series with a transistor 45 connected in the inverted common collector configuration. The transistor 45 contributes additional inductance and negative resistance. This negative resistance allows the unloaded Q of the bandstop resonator to be markedly increased. When the active notch filter of FIG. 8 is tuned by varying the capacitance 43, constant bandwidth is obtained over the tuning range.

In a notch filter it is the ratio L/C which determines the steepness of the notch. Design of an active tunable notch filter which can be tuned over some frequency range while maintaining a constant bandwidth involves some additional considerations. The performance of a single resonator bandstop filter such as illustrated in FIG. 8 is governed by two basic equations. The three dB bandwidth is given by $$\Delta f = z_0/2LN^2$$

and the peak isolation of the notch is given by $$A_{peak} = 20 \text{ Log } (Q_u \Delta f)/f_0$$

where $Q_u$ is the unloaded Q of the series resonant circuit and $f_0$ is the center frequency of the notch. To obtain a narrow notch bandwidth, it can be observed from the above equations that the total series inductance L must be as large as possible. In practice, the maximum value of inductance L that can be used is limited by the self-resonant frequency of the inductance itself. When the stray capacity shunting L becomes significant L effectively becomes frequency dependent, and the bandwidth $\Delta f$ would no longer be constant. Therefore, to obtain constant notch bandwidth over the tuning range the self-resonant frequency of the inductance must be greater than the upper frequency tuning range, and the bandwidth reduction obtainable by simply increasing the inductance L is limited. Further bandwidth reduction is still possible by transforming the terminal impedance level $z_0$ to a reduced impedance level $z_0/N^2$ as illustrated by the impedance transformers 46 and 47 in FIG. 8. By way of a specific example a 16:1 impedance level reduction may be utilized, which yields a −10 dB notch bandwidth of approximately one MHz. An active tunable notch filter such as shown in FIG. 8 can provide a narrow stopband for a notch filter tunable from 100 to 200 MHz. Such a filter can be used to improve receiver performance in the present of a strong interference signal, for example. High rejection is obtained by the use of the active element transistor 45 which produces a negative resistance so as to produce a very high Q resonant circuit. Since the notch is obtained with a single resonant circuit simple tuning results.

Figure 9:
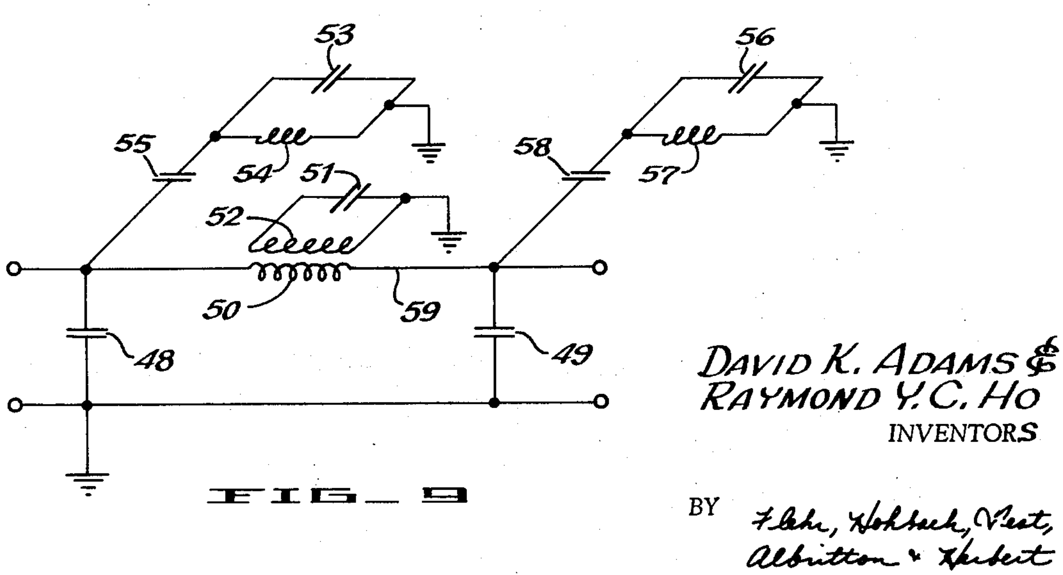
FIG. 9 illustrates an active notch filter which uses a low pass support filter for a coupling network.

Referring now to FIG. 9, there is shown an example of the use of the active resonators of this invention. The circuit of FIG. 9 is a notch filter configuration which uses a low pass support filter for a coupling network. A low pass filter network comprising capacitors 48 and 49 and an inductor 50 is chosen such that it has a sufficient bandwidth to pass all frequencies of interest. Then active notch resonators may be capacitively or inductively coupled to the elements of the low pass filter such that a notch filter characteristic is superimposed upon the low pass characteristic. Thus in FIG. 9 a notch resonator comprising a capacitor 51 and an inductance 52 (which in accordance with this invention is an active loss cancelling resonator element) is inductively coupled to the inductance 50. Another notch resonator comprising capacitor 53 and active resonator loss cancelling inductance 54 is capacitively coupled to the low pass filter elements through a capacitor 55. Similarly, a notch resonator comprising capacitor 56 and active resonator loss cancelling inductance 57 is capacitively coupled to the low pass filter elements through a capacitor 58. Thus a notch filter results which is indirectly coupled to the transmission line 59.

Figure 10:
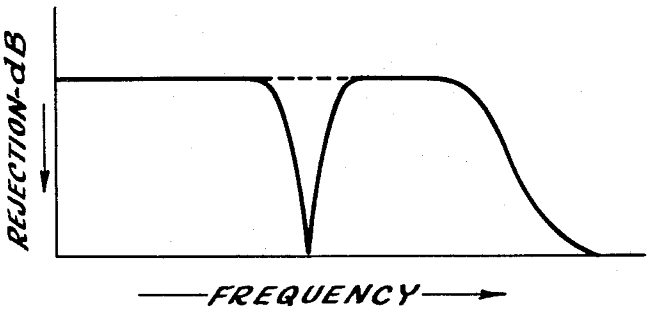
FIG. 10 is a plot of rejection versus frequency for the filter network of FIG. 9.

The characteristics of rejection versus frequency for the network of FIG. 9 is shown in FIG. 10. It can be seen that the notch is superimposed upon the low pass filter characteristic.

Figure 11:
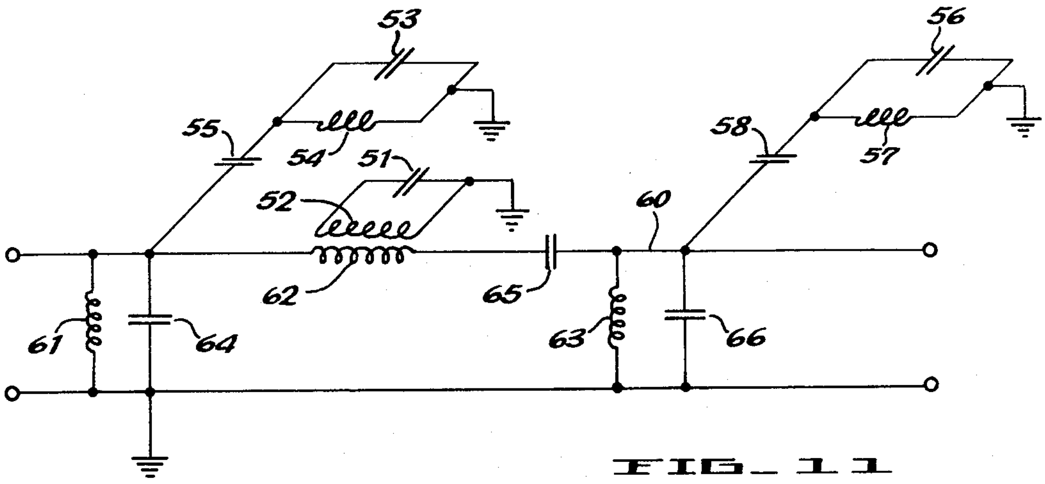
FIG. 11 illustrates an active notch filter which uses a band-pass support filter for a coupling network.
Figure 12:
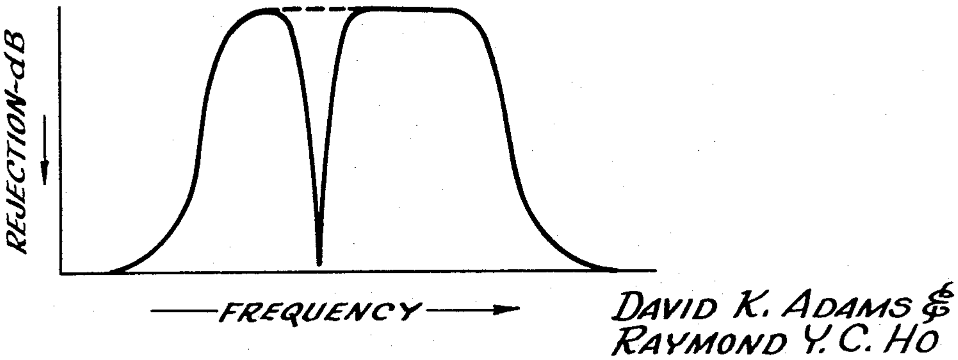
FIG. 12 is a plot of rejection versus frequency for the filter network of FIG. 11.

FIG. 11 is similar to FIG. 9 except that the notch resonators are indirectly coupled to a transmission line 60 through a bandpass filter disposed in the transmission line. The bandpass filter comprises inductances 61, 62 and 63 and capacitors 64, 65 and 66. As can be seen in FIG. 12, the notch characteristic is superimposed on the bandpass filter characteristic.

In both FIGS. 9 and 11, active notch resonators or filters are coupled to each of the low or bandpass filter elements. This technique simultaneously minimizes filter size and pass-band loss. However, other options exist, such as coupling only to the capacitive elements or only to the inductive elements.

When active loss cancelling resonators with capacitive tuning are coupled to only the inductive elements of the low-pass filter, a tunable bandstop filter with constant bandwidth will result.

While particular embodiments of the invention have been shown there will of course be understood that the invention is not limited to these specific embodiments, since many modifications both in the circuit arrangements and in the instrumentalities employed may be made. It is contemplated that the appended claims will cover any such modifications as fall within the true spirit and scope of this invention.

We claim:

1. An active inductive loss cancelling filter element having first and second terminals and including first and second inductances, and a transistor having base emitter and collector electrodes, base circuit means for connecting said base electrode to said first terminal, collector circuit means for connecting said collector to said first terminal, emitter circuit means for connecting said emitter through said first inductance to said second terminal, said second inductance connected between said emitter electrode and said collector electrode.

2. The active inductive filter element of claim 1 wherein said base circuit means for connecting said base electrode to said first terminal includes a third inductance.

3. The active inductive filter element of claim 1 including dc power source means coupled to said emitter electrode and said collector electrode for biasing said transistor.

4. The active inductive filter element of claim 3 wherein said dc power source means includes switch means for disconnecting dc power from said base electrode and said collector electrodes whereby bias is removed from said transistor.

5. An active notch filter for operation at high frequencies including a transmission line, a reference potential terminal, and a resonator, said resonator connected between said transmission line and said reference potential terminal and including a capacitance and an active inductive filter element, said active inductive filter element having first and second terminals and including a first inductance, a second inductance, and a transistor having base emitter and collector electrodes, base circuit means connecting said base electrode to said first terminal, collector circuit means connecting said collector electrode to said first terminal, emitter circuit means connecting said emitter electrode through said first inductance to said second terminal, and said second inductance connected between said emitter electrode and said collector electrode.

6. The active notch filter of claim 5 wherein said base circuit means connecting said base electrode to said first terminal includes a third inductance.

7. The active notch filter of claim 5 wherein said capacitance is adjustable for varying the notch frequency.

8. The active notch filter of claim 5 including dc power source means coupled to said emitter electrode and said base electrode for biasing said transistor.

9. The active notch filter of claim 8 wherein said dc power supply means is adjustable to vary the bias on said transistor.

10. The active notch filter of claim 8 wherein said dc power supply means includes switch means for removing the bias from said transistor.

11. A filter network for operation at high frequencies including a transmission line, band-pass filter means including a capacitance and an inductance disposed along said transmission line, an active notch resonator, means for coupling said active notch resonator to said bandpass filter means whereby characteristics of said active notch resonator are superimposed on characteristics of said passive bandpass filter means, and wherein said active notch resonator comprises a capacitance and an active inductive filter element having first and second terminals and including a first inductance, a second inductance and a transistor having base emitter and collector electrodes, base circuit means connecting said base electrode to said first terminal, collector circuit means connecting said collector electrode to said first terminal, emitter circuit means connecting said emitter electrode through said first inductance to said second terminal, and said second inductance connected between said emitter electrode and said collector electrode.

12. The filter network of claim 11 wherein said inductance in said bandpass filter means comprises active inductive elements.

13. The filter network of claim 11 wherein said bandpass filter means is a low pass filter.

* * * * *